(12) United States Patent
Takahama (10) Patent No.: US 10,551,174 B2
(45) Date of Patent: Feb. 4, 2020

(54) CALIBRATION METHOD OF IMAGE MEASURING DEVICE

(71) Applicant: MITUTOYO CORPORATION, Kanagawa (JP)

(72) Inventor: Yasuhiro Takahama, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/161,571

(22) Filed: Oct. 16, 2018

(65) Prior Publication Data

US 2019/0113333 A1 Apr. 18, 2019

(30) Foreign Application Priority Data

Oct. 18, 2017 (JP) ................. 2017-201946

(51) Int. Cl.
*G01B 11/24* (2006.01)
*H04N 5/225* (2006.01)
*G01B 9/02* (2006.01)

(52) U.S. Cl.
CPC ...... *G01B 11/2441* (2013.01); *G01B 9/02068* (2013.01); *H04N 5/2258* (2013.01)

(58) Field of Classification Search
CPC ............ G01B 11/2441; G01B 9/02068; H04N 5/2258
See application file for complete search history.

(56) References Cited

U.S. PATENT DOCUMENTS 9,417,123 B2 8/2016 Yoshida et al.
2004/0235205 A1* 11/2004 Levy ............... G01N 21/211
438/14
2012/0099115 A1 4/2012 Matsumiya et al.

FOREIGN PATENT DOCUMENTS

JP 2012-093166 A 5/2012

* cited by examiner

*Primary Examiner* — Jamil Ahmed
(74) *Attorney, Agent, or Firm* — Greenblum & Bernstein, P.L.C.

(57) ABSTRACT

The present invention includes a preparatory step of providing a calibration work piece having a flat reflecting surface as a work piece, and arranging the reflecting surface to be parallel to a standard optical axis and orthogonal or parallel to pixel array directions of an image capture element; a rotation step of rotating a prism centered on the standard optical axis; a brightness detection step of detecting the brightness of an image captured by the image capture element at each of a plurality of rotation positions of the prism; and a positioning step of aligning the prism at a rotation position where the brightness detected by the brightness detection step is greatest.

4 Claims, 7 Drawing Sheets

CALIBRATION METHOD OF IMAGE MEASURING DEVICE

CROSS-REFERENCE TO RELATED APPLICATIONS

The present application claims priority under 35 U.S.C. § 119 of Japanese Application No. 2017-201946, filed on Oct. 18, 2017, the disclosure of which is expressly incorporated by reference herein in its entirety.

BACKGROUND OF THE INVENTION

1. Field of the Invention

The present invention relates to a calibration method of an image measuring device.

2. Description of Related Art

Conventionally, an optical interference measuring device is known which accurately measures the surface shape of a work piece using brightness information in an interference pattern generated by optical interference. For example, the optical interference measuring device disclosed in Japanese Patent Laid-open Publication No. 2012-093166 includes an optical interference optical system which splits light from a light source into measurement light and reference light, and combines the measurement light that is reflected off a work piece and the reference light that is reflected off a reflecting plane. While changing the optical path length of the reference light or measurement light, the optical interference measuring device uses an image capture element such as a CCD camera to capture an interference image showing a two-dimensional distribution of interference optical intensity. Then, based on the captured image information, the surface shape of the work piece can be accurately measured by detecting the focal depth where the intensity of optical interference reached a peak at each measurement position within the image capture field of view.

In recent years, techniques have been developed for making accurate observations of an interior wall of a cylindrical work piece, such as an engine cylinder, using optical interference measuring devices (for example, Japanese Application No. 2016-034436). The optical interference measuring device used in such a technique includes a probe capable of being inserted inside the cylindrical work piece and an optical interference optical system configured by the probe. The optical interference optical system includes a prism that splits light advancing along a standard optical axis that is substantially coaxial with the axis of the probe into measurement light, which advances in a direction orthogonal to the standard optical axis, and reference light, which advances along the standard optical axis; and combines the measurement light reflected off a work piece and the reference light reflected off a reference plane.

In such an optical interference measuring device, it is essential that the prism be positioned appropriately. For example, in order to measure a region that is broader than the surface of the work piece, the probe is displaced relative to the work piece in a vertical or transverse direction of the measurement region to change measurement regions, and after performing measurement for each measurement region, images of adjacent measurement regions are spliced together. At this point, in order to splice together interference images, a displacement axis of the probe on the image and the vertical or transverse direction of the image are preferably parallel to each other.

However, when a rotation position of the prism centered on the standard optical axis is offset from the position the prism is meant to occupy, this causes the measurement light to be bent by the prism, and the image may be captured in a form slightly rotated from the intended image. In such a case, the displacement axis of the probe on the image is oblique relative to the vertical and transverse directions of the image, and therefore offset occurs at peripheral regions of each image in the images of adjacent measurement regions. Accordingly, splicing together the images of adjacent measurement regions may become difficult.

Also, a similar problem is shared by measuring devices which bend measurement light, and is not limited to optical interference measuring devices. Specifically, in an image measuring device that includes an optical axis converter (represented by the prism described above, or the like), there is a similar problem caused by the positioning of the optical axis converter being offset due to the measurement light reflected off the work piece being bent in a direction lying along the standard optical axis which intersects the measurement optical axis of the measurement light.

SUMMARY OF THE INVENTION

The present invention provides a calibration method of an image measuring device for appropriately positioning an optical axis converter that bends measurement light.

A calibration method of an image measuring device according to the present invention is a calibration method of an image measuring device that includes an optical axis converter bending measurement light reflected off a work piece in a direction lying along a standard optical axis that intersects with a measurement optical axis of the measurement light, and an image capture element receiving the measurement light bent by the optical axis converter. The calibration method includes a preparatory step of providing a calibration work piece having a flat reflecting surface as the work piece, and arranging the reflecting surface to be parallel to the standard optical axis and orthogonal or parallel to pixel array directions of the image capture element; a rotation step of rotating the optical axis converter centered on the standard optical axis; a brightness detection step of detecting the brightness of an image captured by the image capture element at each of a plurality of rotation positions of the optical axis converter; and a positioning step of aligning the optical axis converter at a rotation position where the brightness detected by the brightness detection step is greatest.

In the present invention, first the preparatory step is performed, in which the calibration work piece having the flat reflecting surface is arranged as the work piece. At this point, preparations for subsequent steps are carried out by arranging the reflecting surface of the calibration work piece to be parallel to the standard optical axis and orthogonal or parallel to the pixel array directions of the image capture element.

Next, the rotation step of rotating the optical axis converter centered on the standard optical axis and the brightness detection step of detecting the brightness of the image at each of the plurality of rotation positions of the optical axis converter are performed. At this point, the rotation step and the brightness detection step may detect the brightness of the image each time the optical axis converter is rotated by a predetermined angle, or may continuously detect the brightness of the image while the optical axis converter is rotated within a predetermined angle range. Also, although the overall rotation angle of the optical axis converter from the rotation step is not particularly limited, when the optical axis converter is aligned to some extent beforehand, the overall rotation angle is preferably no more than 90°.

In the brightness detection step, the detected brightness of the image varies in accordance with the rotation position of the optical axis converter. For example, when the measurement optical axis is orthogonal to the reflecting surface of the calibration work piece, the amount of light incident on the image capture element is the greatest and the brightness of the image is the greatest. Meanwhile, when the measurement optical axis is oblique to the reflecting surface of the calibration work piece, the amount of light incident on the image capture element is reduced and the brightness of the image drops. In the brightness detection step, the brightness of the image may also be detected by a worker verifying an image displayed on a display (described below), or the brightness of the image (for example, the brightness of a predetermined coordinate region or the average brightness of the entire image) may be detected with a controller that controls operations of the image measuring device acting as a brightness detector (described below).

Next, the positioning step is performed, in which the optical axis converter is aligned at the rotation position where the brightness detected by the brightness detection step is greatest. Accordingly, the optical axis converter is positioned such that the measurement optical axis is orthogonal to the reflecting surface of the calibration work piece. In other words, the optical axis converter is positioned such that the measurement optical axis is orthogonal or parallel to the pixel array directions of the image capture element. The "brightness" of the image means a degree of brilliance of the image, and detecting the greatest level of brightness means detecting a state where the image is most brilliant.

According to the method described above, the optical axis converter is positioned appropriately in the image measuring device. Accordingly, when the probe that includes the optical axis converter is displaced relative to the work piece in a vertical or transverse direction of a measurement region in order to change measurement regions, for example, a displacement axis of the image captured by the image capture element is parallel to the vertical or transverse direction of the image. Therefore, offset at the peripheral regions of each image can be constrained, and the images of adjacent measurement regions can be readily spliced together.

In the calibration method of the image measuring device according to the present invention, preferably, the image measuring device further includes a brightness detector detecting the brightness of the image, and in the brightness detection step, the brightness detector detects the brightness of the image. According to this method, the brightness of the image can be detected as a numerical value, and therefore the optical axis converter can be aligned more accurately.

In the calibration method of the image measuring device according to the present invention, preferably, the image measuring device further includes a display displaying brightness information, and in the brightness detection step, the brightness information is displayed on the display for each of the plurality of rotation positions of the optical axis converter. According to this method, a worker can readily comprehend the rotation position with the greatest brightness. The brightness information should be at least one of the image captured by the image capture element and a value for the brightness (brightness value) detected by the brightness detector.

The present invention can provide a calibration method of an image measuring device for appropriately positioning an optical axis converter that bends measurement light.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 6A to 6C are schematic views, where FIG. 6A describes an arrangement of the prism, FIG. 6B describes the brightness of an image.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings.

Configuration of Optical Interference Measuring Device

Figure 1:
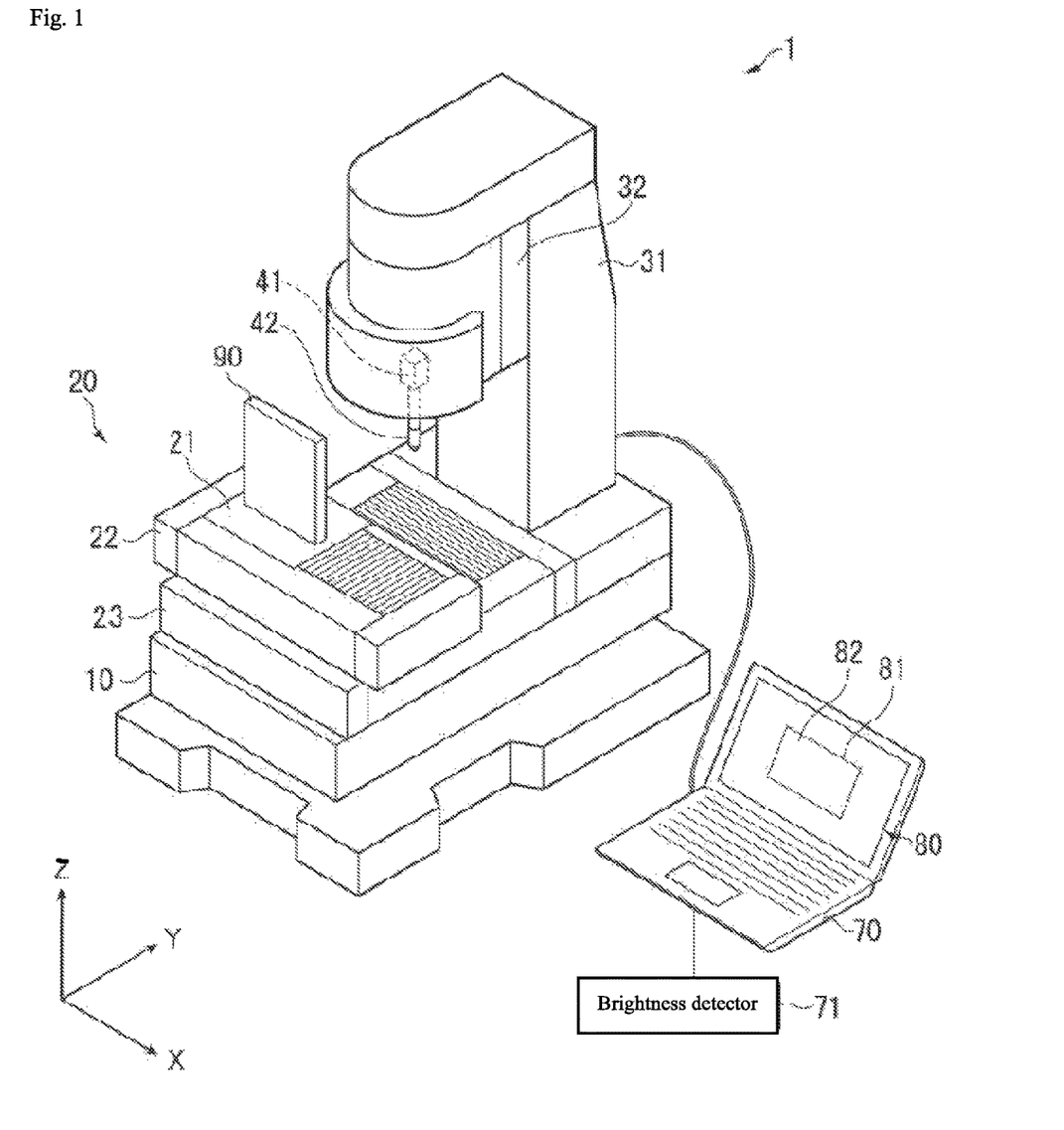
FIG. 1 illustrates an external view of an optical interference measuring device according to an embodiment of the present invention, and is also a perspective view schematically illustrating an overview of a controller.
Figure 2:
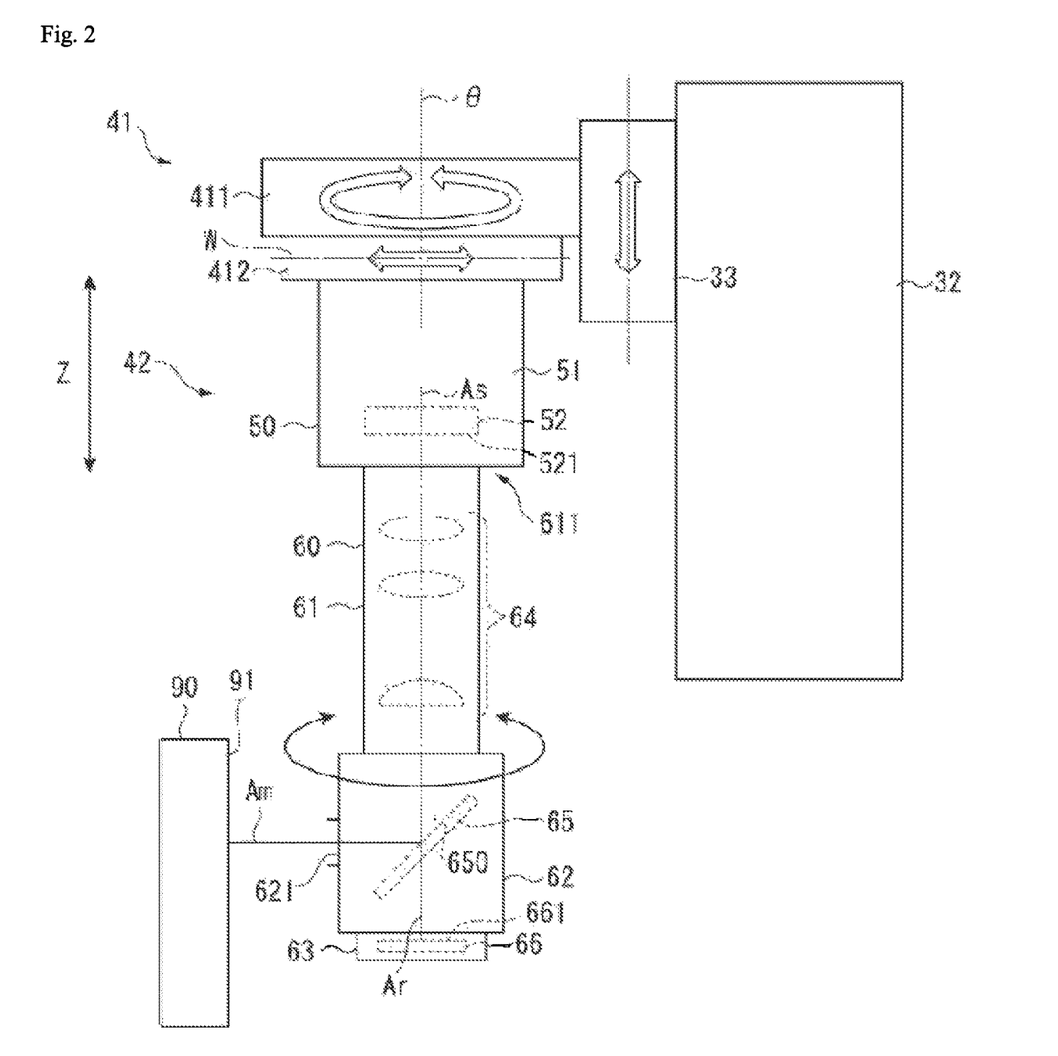
FIG. 2 is a side view illustrating an interference object lens and peripheral members in the optical interference measuring device according to the embodiment.

As illustrated in FIGS. 1 and 2, an optical interference measuring device 1 includes a table 10, a stage 20, a support column 31, a Z axis displacement mechanism 32, a probe support mechanism 41, a probe 42, a controller 70, and a display 80. The optical interference measuring device 1 is one example of an image measuring device according to the present invention, and is a device capable of measuring the surface shape of a work piece in fine detail based on an interference image. In addition, the probe 42 is configured to include a prism 65, which is an example of an optical axis converter according to the present invention, and an image capture element 52 which receives measurement light that is bent by the prism 65 (see FIG. 2).

The optical interference measuring device 1 according to the present embodiment is appropriate for measuring an interior wall of a cylindrical work piece by inserting a tip portion of the probe 42 into the cylindrical work piece. An example of the cylindrical work piece may be an engine cylinder, for example. However, rather than a work piece, a calibration work piece 90 is shown in FIGS. 1 and 2 in order to describe a calibration method for the optical interference measuring device 1 hereafter.

The table 10 is the base of the optical interference measuring device 1. The stage 20 is provided on the table 10 and includes a placement surface 21 that is parallel to a horizontal direction (XY plane direction), an X axis displacement mechanism 22, and a Y axis displacement mechanism 23. The work piece is placed on the placement surface 21. The placement surface 21 is capable of displacement in X and Y axis directions using the X axis displacement mechanism 22 and the Y axis displacement mechanism 23.

The support column 31 is provided rising along a Z axis direction from a top surface of the table 10, and supports a slider 33 via the Z axis displacement mechanism 32. The slider 33 is capable of displacement in the Z axis direction using the Z axis displacement mechanism 32. In addition, the slider 33 supports the probe 42 via a probe support mechanism 41.

The probe support mechanism 41 includes a rotation driver 411 and a linear driver 412. The rotation driver 411 is provided to the slider 33 via a connecting member not shown in the drawings, and can rotate the probe 42 on a θ axis, as the axis of rotation, that is parallel to the Z direction. The linear driver 412 is provided to the rotation driver 411 and can displace the probe 42 along a W axis that is one direction parallel to the XY plane.

The probe 42 has a shape that extends along the Z axis and is mounted to the linear driver 412 such that a measurement optical axis Am described hereafter is parallel to the W axis. In addition, the probe 42 may include, for example, a light source that is a white light source (not shown in the drawings), an image capturer 50, and an interference object lens 60.

Figure 3A:
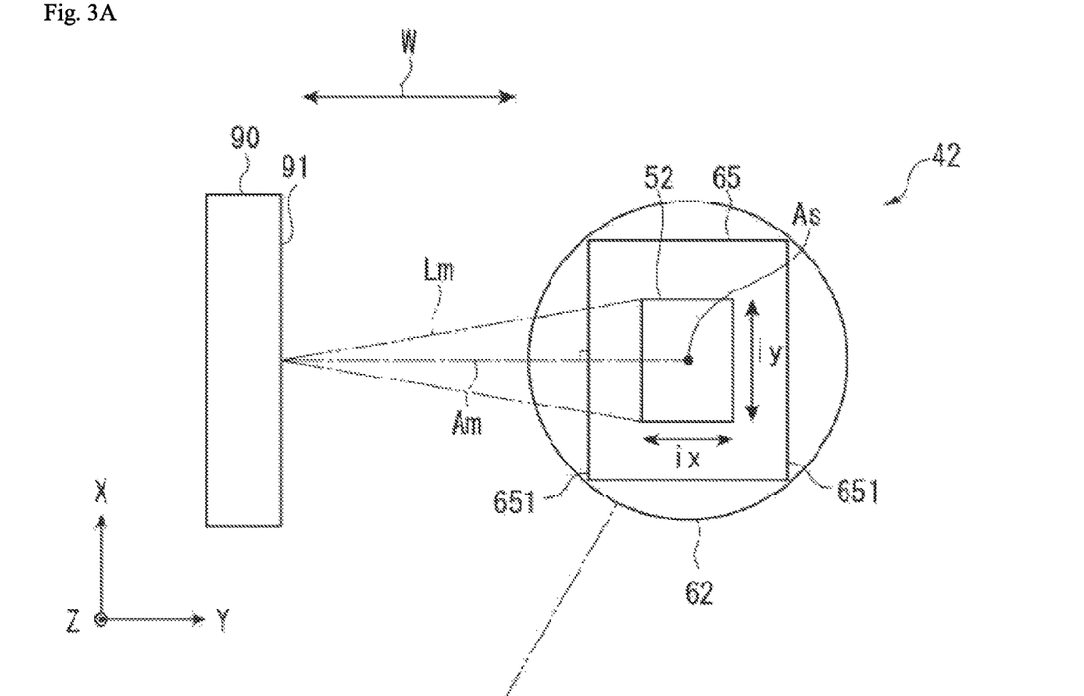
FIGS. 3A and 3B are schematic views, where FIG. 3A describes an arrangement of a prism and FIG. 3B describes the tilt of an image.

The image capturer 50 includes a case 51 that is attached to the linear driver 412 and the image capture element 52 that is installed inside the case 51. The image capture element 52 may be configured by an image sensor such as a CCD (Charge Coupled Device) or CMOS (Complementary Metal Oxide Semiconductor), for example. A light-receiving surface 521 of the image capture element 52 is arranged so as to be orthogonal to the Z axis, and faces an optical path of the interference object lens 60 via an aperture (not shown in the drawings) formed in the bottom of the case 51. In addition, a plurality of pixels configuring the image capture element 52 are arrayed along mutually orthogonal ix and iy directions, on a plane orthogonal to the Z axis (see FIG. 3). The image capture element 52 is installed such that the ix and iy directions (pixel array directions) are either orthogonal or parallel to the W axis of the linear driver 412.

The interference object lens 60 is configured to include a first case 61, a second case 62, a third case 63, a guiding optical system 64, the prism 65, and a reference flat 66.

The first case 61 includes, in an upper portion thereof, a connector 611 that rotatably connects to the image capturer 50. This allows the interference object lens 60 to rotate relative to the image capturer 50 as necessary, for calibration for example. In addition, the guiding optical system 64 is installed inside the first case 61 and an aperture (not shown in the drawings) for the optical path is formed in the top and bottom of the first case 61. The second case 62 is connected below the first case 61, and the prism 65 is installed inside the second case 62. An aperture (not shown in the drawings) for the optical path is formed in the top and bottom of the second case 62, and a measurement aperture 621 that faces the front surface side of the prism 65 (measurement light emission side, described below) is formed in the side of the second case 62. The third case 63 is connected below the second case 62, and the reference flat 66 is installed inside the third case 63. An aperture (not shown in the drawings) for the optical path is formed in the top of the third case 63.

The guiding optical system 64 is configured by optical members such as a plurality of lenses, and expands the diameter of the optical path of a light beam fired from the light source and calibrates the light beam to be parallel light oriented toward the prism 65 along a standard optical axis As that is parallel to the Z axis. In addition, the guiding optical system 64 guides combined light (described below) emitted from the prism 65 toward the light-receiving surface 521 of the image capture element 52. The center axis line of the first case 61 is substantially coaxial with the standard optical axis As of the guiding optical system 64. Also, the lenses of the guiding optical system 64 depicted in FIG. 2 are schematic renderings.

The prism 65 may configure a half mirror tilted 45° relative to the standard optical axis As, for example. The prism 65 reflects light from the guiding optical system 64 to serve as measurement light, while the remainder passes through to serve as reference light. In other words, the prism 65 splits the light from the guiding optical system 64 into measurement light and reference light. In the present embodiment, a side of the prism 65 that configures a reflecting surface 650 has a side 651 that is parallel to the XY plane and orthogonal to the measurement optical axis Am (see FIG. 3A). The reference flat 66 may be a disk-like mirror, for example, and includes a reference plane 661. The reference plane 661 reflects the reference light divided by the prism 65.

The measurement light divided by the prism 65 travels toward the work piece (or the calibration work piece 90) along the measurement optical axis Am that is orthogonal to the standard optical axis As and, after the measurement light has been reflected off the surface of the work piece, the measurement light returns to the prism 65 along the measurement optical axis Am. Meanwhile, the reference light divided by the prism 65 travels toward the reference flat 66 along a reference optical axis Ar that is coaxial with the standard optical axis As and, after the reference light has been reflected off the reference plane 661 of the reference flat 66, the reference light returns to the prism 65 along the reference optical axis Ar.

The prism 65 combines the reference light reflected by the reference plane 661 with the measurement light reflected by the work piece and guides the combined light to the guiding optical system 64. Interference between the reference light and the measurement light is produced in the combined light. The combined light passes through the guiding optical system 64 and strikes the light-receiving surface 521 of the image capture element 52. The image capture element 52 is capable of capturing an image of an interference pattern in the incident combined light.

The controller 70 controls operations of the optical interference measuring device 1 by executing a program stored in an internal memory. Specifically, the controller 70 can control driving of the X axis displacement mechanism 22, the Y axis displacement mechanism 23, the Z axis displacement mechanism 32, and the probe support mechanism 41. In addition, the controller 70 can display an image 82 captured by the image capture element 52 on the display 80, and can parse a three-dimensional shape of the work piece surface based on the image 82. The controller 70 can act as a brightness detector 71. The brightness detector 71 detects the brightness of the image 82 captured by the image capture element 52. In this example, the brightness of the image 82 detected by the brightness detector 71 may, for example, be the brightness of a predetermined coordinate region of the image 82, or may be the average brightness of the image 82 overall. The "brightness" of the image 82 means a degree of brilliance of the image 82, and the brightness detector 71 can detect the brightness of the image 82 using a known technique.

The display 80 displays, as brightness information, the image 82 captured by the image capture element 52 and a value for the brightness (hereafter referred to as the brightness value) 83 detected by the brightness detector 71. In the present embodiment, the display 80 displays the image 82 within a display screen 81, and also provides an overlay display of the brightness value 83 on the displayed image 82 (see FIG. 3B, for example). In the present embodiment, the controller 70 and the display 80 are integrally configured as a PC (Personal Computer).

In the optical interference measuring device 1 configured as described above, the relative positioning of the probe 42 with respect to the work piece is determined by the X axis displacement mechanism 22, the Y axis displacement mechanism 23, the Z axis displacement mechanism 32, and the rotation driver 411. In addition, the W axis direction of the linear driver 412 on the XY plane is determined by determining the rotation position of the probe 42 relative to the θ axis using the rotation driver 411. In this example, the W axis direction is preferably a direction orthogonal to a measured surface of the work piece. Also, the linear driver 412 displaces the probe 42 in the W axis direction, thereby bringing the probe 42 closer to or farther from the work piece. While the probe 42 is displacing in this way, the image capture element 52 captures an image of a predetermined region of the work piece, thereby enabling the controller 70 to acquire an interference image in which the optical path length of the measurement light has been altered.

Calibration Method of Optical Interference Measuring Device

Calibration of the optical interference measuring device 1 is described with reference to FIGS. 3A to 7. FIGS. 3A to 5B illustrate a state where the calibration work piece 90 is provided instead of the work piece. Normally, the probe 42 is arranged as illustrated in FIG. 3A. Specifically, the image capture element 52 is provided such that the ix and iy directions (pixel array directions) are either orthogonal or parallel to the W axis, and the prism 65 is provided such that the measurement optical axis Am is parallel to the W axis. In other words, the measurement optical axis Am is parallel to the W axis, and is parallel to one of the pixel array directions (the ix direction in FIG. 3A) of the image capture element 52.

Figure 3B:
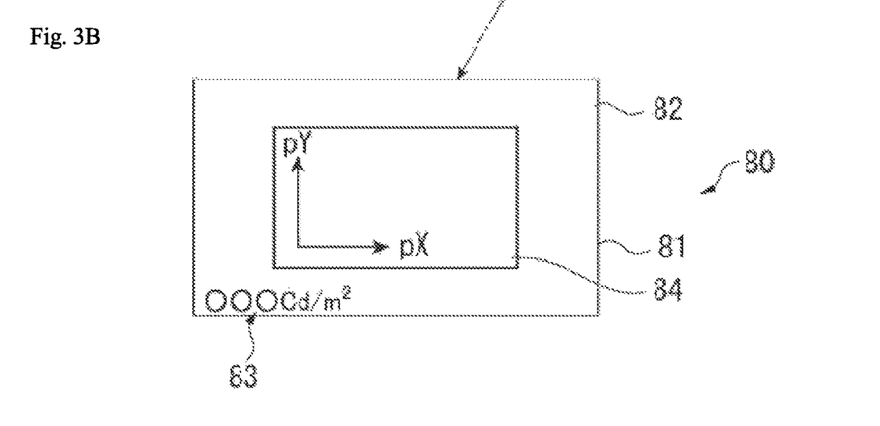

In this example, a case is considered where the probe 42 is displaced relative to the work piece and the measurement region of the work piece is modified. At this point, the probe 42 is displaced in the Z axis direction or in a circumferential direction within the XY plane, and the image 82 captured by the image capture element 52 transitions in accordance with the displacement direction of the probe 42. When the probe 42 is positioned appropriately, as illustrated in FIG. 3A, displacement axes pX and pY of the probe 42 in the image 82 are parallel to a transverse direction or vertical direction of the image 82, as illustrated in FIG. 3B. Accordingly, the images 82 of adjacent measurement regions on the work piece can be readily spliced together.

Figure 4A:
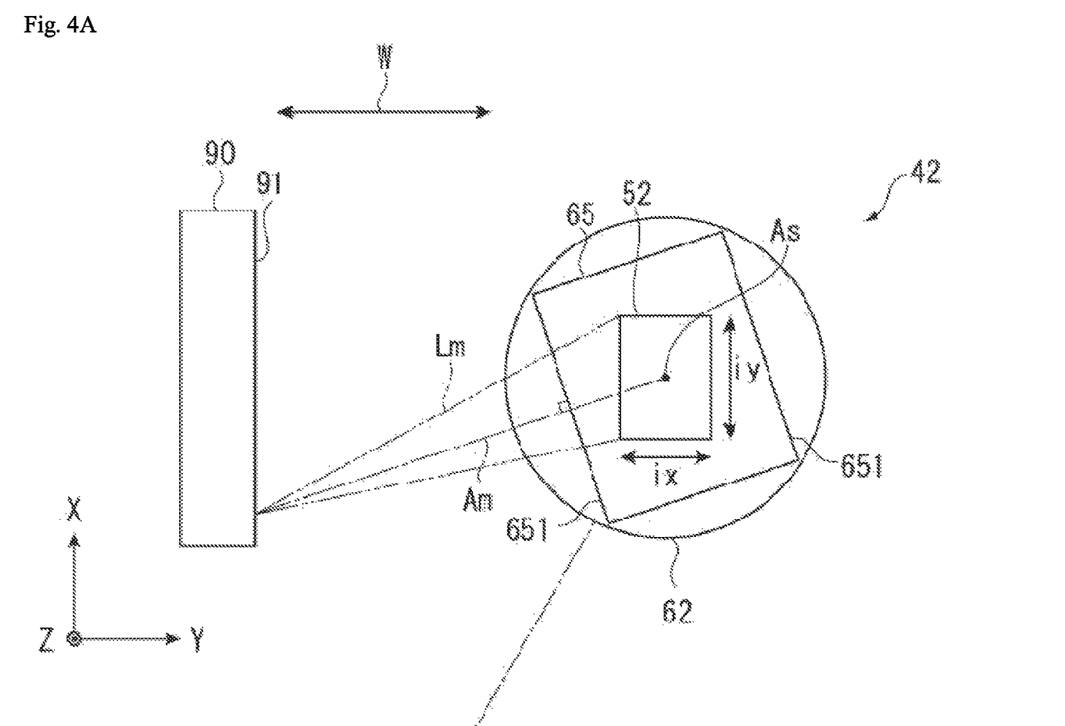
FIGS. 4A and 4B are schematic views, where FIG. 4A describes an arrangement of the prism and FIG. 4B describes the tilt of an image.
Figure 4B:
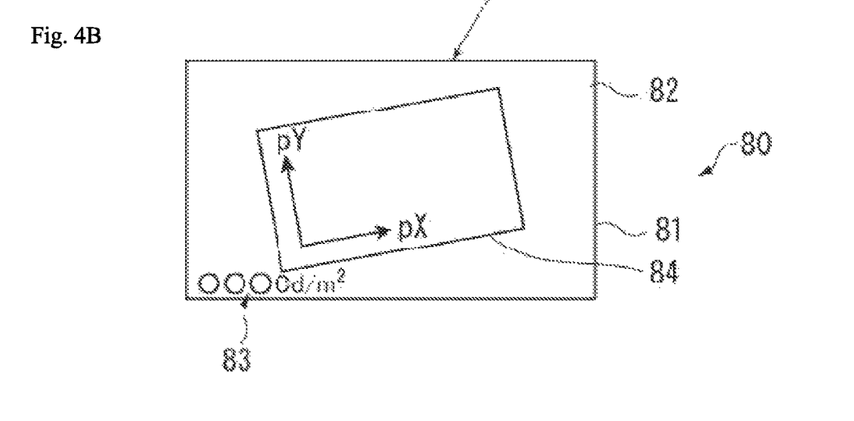
Figure 5A:
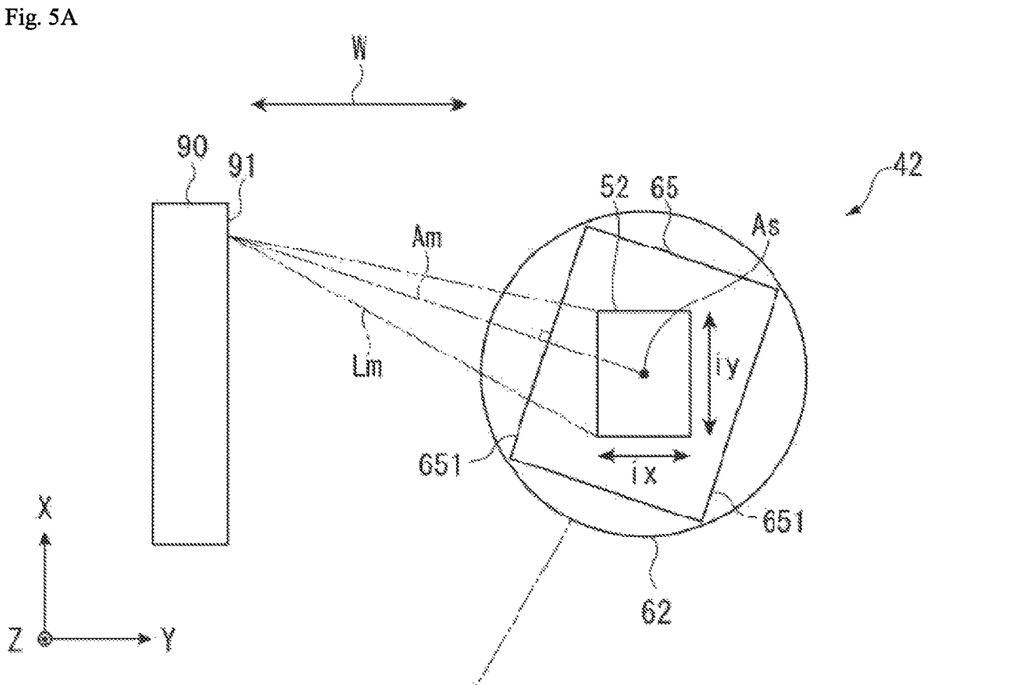
FIGS. 5A and 5B are schematic views, where FIG. 5A describes an arrangement of the prism and FIG. 5B describes the tilt of an image.

If, as illustrated in FIGS. 4A and 5A, the prism 65 is offset from the appropriate positioning, the measurement optical axis Am of the prism 65 is positioned obliquely to the W axis and the pixel array directions (ix direction and iy direction) of the image capture element 52. In such a case, the image 82 captured by the image capture element 52 is in a state slightly rotated from an original state, which is due to measurement light Lm being bent by the prism 65 (see FIGS. 4B and 5B). At this point, the displacement axes pX and pY of the probe 42 in the image 82 are oblique relative to the vertical and transverse directions of the image 82. Accordingly, offset is produced at peripheral regions of each image 82, and therefore splicing together the images 82 of adjacent measurement regions may become difficult.

In view of this, in the present embodiment, when mounting the interference object lens 60 on the image capturer 50 or when calibrating the optical interference measuring device 1, for example, the optical interference measuring device 1 is calibrated as described below.

Figure 5B:
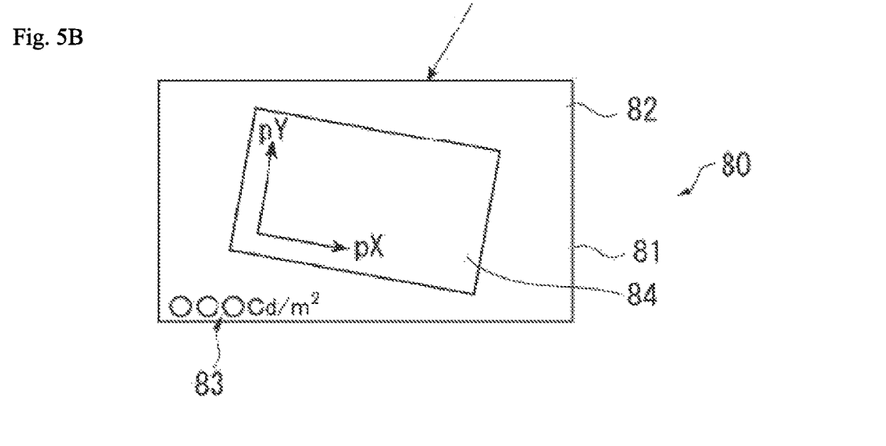

First, the calibration work piece 90 is arranged on the placement surface 21 of the stage 20 (preparatory step S1). The calibration work piece 90 includes a flat reflecting surface 91. Using chrome deposition or the like, a predetermined pattern 84 is formed on the reflecting surface 91 as a test chart. Although FIGS. 3B, 4B, and 5B illustrate a rectangular pattern 84 in order to simplify the description, the pattern of the test chart is not limited to this. In the preparatory step S1, by positioning the reflecting surface 91 of the calibration work piece 90 so as to be parallel to the standard optical axis As, an amount of light received by the image capture element 52 is ensured. In addition, by positioning the reflecting surface 91 of the calibration work piece 90 so as to be orthogonal to the W axis, the reflecting surface 91 is arranged orthogonal or parallel to the pixel array directions (ix direction and iy direction) of the image capture element 52. At this point, the brightness of the image 82 at the current rotation position of the interference object lens 60 may be detected.

Figure 6A:
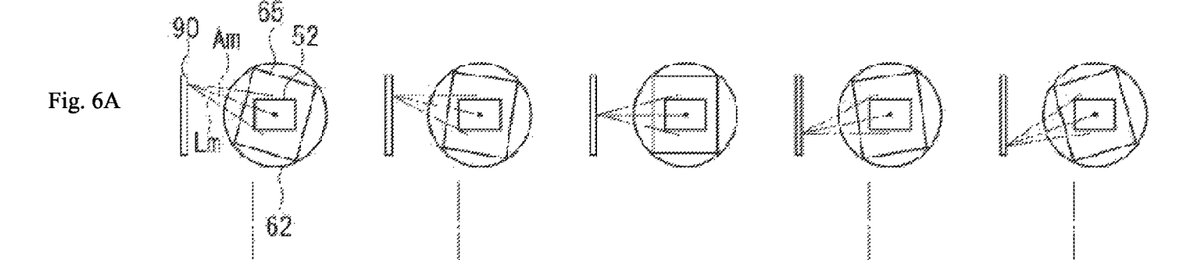

Next, the interference object lens 60 is rotated by a very small angle, centered on the standard optical axis As (rotation step S2; see FIG. 6A). In this example, the very small angle by which the prism 65 is rotated is not particularly limited, but is preferably from several degrees to several tens of degrees. For example, the very small angle may be rotated by a manual operation by a worker, or the connector 611 of the interference object lens 60 may be configured so as to rotate very slightly at a predetermined pitch.

Figure 6B:
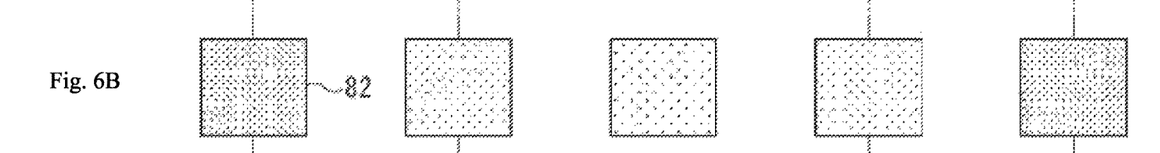

Next, the brightness of the image 82 at the current rotation position of the interference object lens 60 is detected (brightness detection step S3; see FIG. 6B). Specifically, the brightness detector 71 may detect the brightness of the image 82 and record the detected brightness in a memory of the controller 70 or the like. In addition, the brightness detector 71 displays on the display 80 the brightness value 83, which indicates the detected brightness, and thereby the worker may verify the brightness value 83 displayed on the display 80.

Figure 6C:
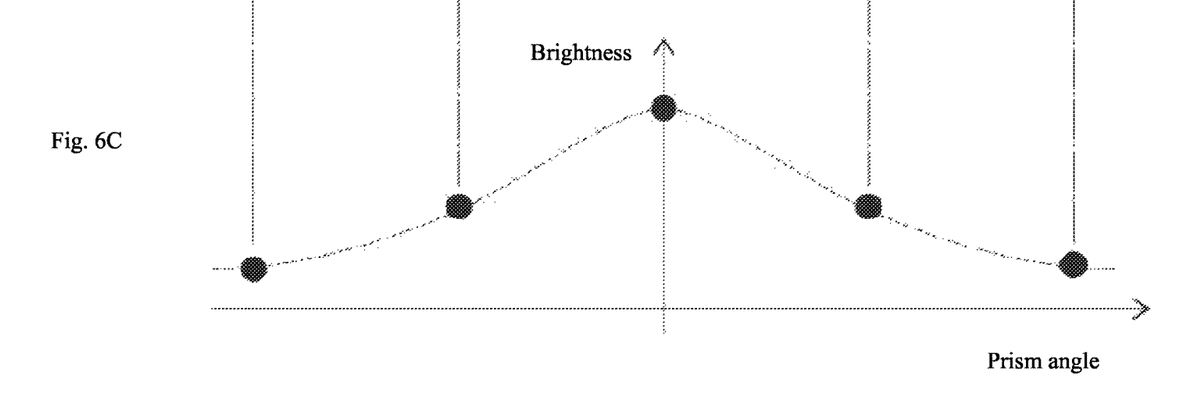
FIG. 6C is a graph illustrating a relationship between the prism angle and the brightness of the image.
Figure 7:
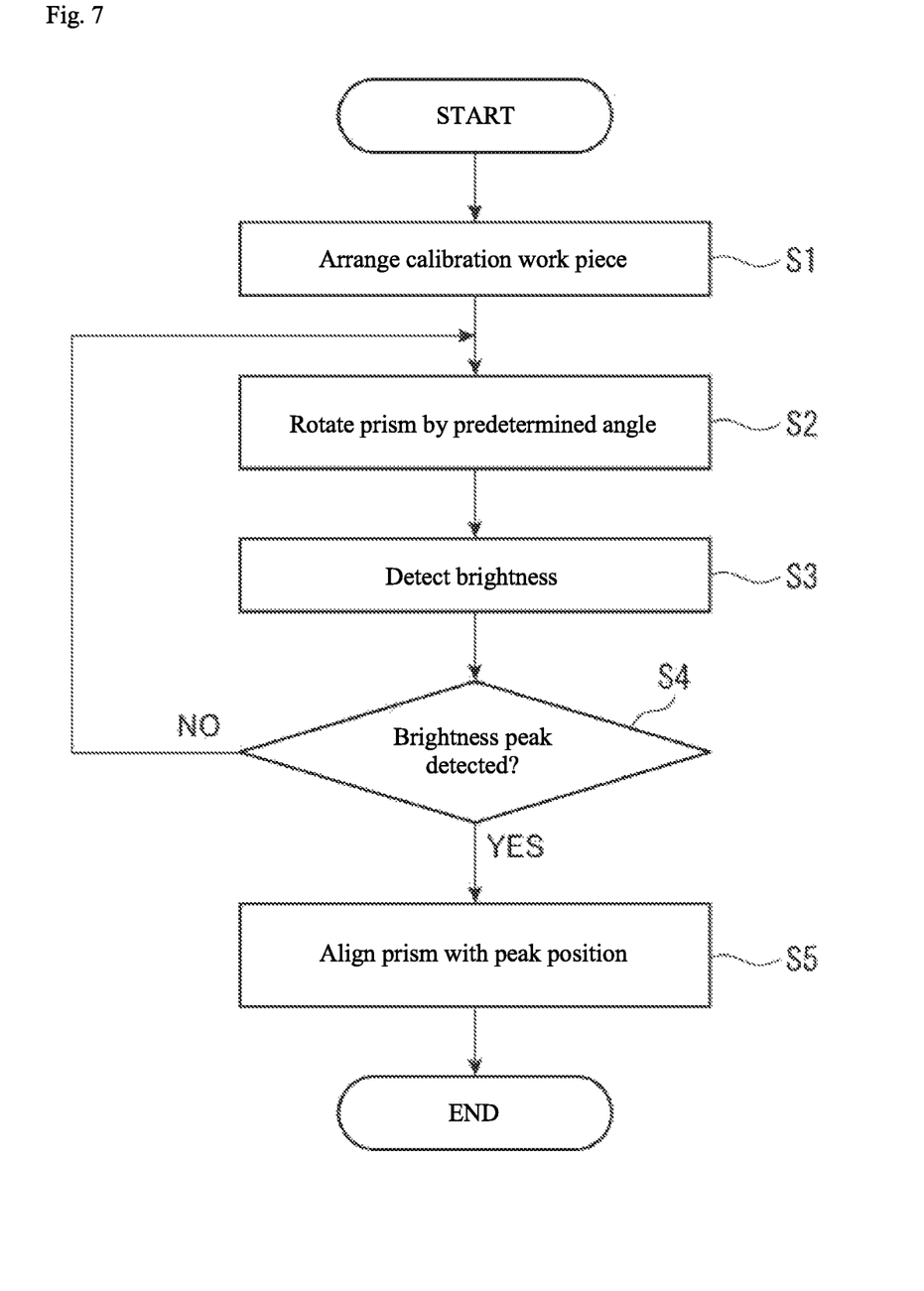
FIG. 7 is a flow chart describing a method of calibrating the optical interference measuring device according to the embodiment.

In the brightness detection step S3, the detected brightness of the image 82 varies in accordance with the angle of rotation of the prism 65 from the appropriate position (see FIG. 6C). For example, when the direction in which the prism 65 emits the measurement light Lm (that is, the measurement optical axis Am of the prism 65) is orthogonal to the reflecting surface 91 of the calibration work piece 90, the amount of light incident on the image capture element 52 is the greatest and the brightness of the image 82 is the greatest. Meanwhile, when the measurement optical axis Am of the prism 65 is oblique to the reflecting surface 91 of the calibration work piece 90, the amount of light incident on the image capture element 52 is reduced and the brightness of the image 82 drops.

Next, a determination is made as to whether the highest brightness value constituting a peak (a brightness peak) was detected (peak detection step S4). In this step, the brightness detector 71 may detect the brightness peak based on the recorded brightness values and display the detected brightness peak on the display 80. In addition, the worker may judge the brightness peak based on the brightness value 83 displayed on the display 80.

The procedure from the rotation step S2 through the peak detection step S4 described above is repeated until a brightness peak is detected. Accordingly, the brightness of the image 82 is detected at each of a plurality of rotation positions of the prism 65. Although the overall rotation angle of the prism 65 from the rotation step S2 is not particularly limited, when the prism 65 is aligned to some extent beforehand, the overall rotation angle is preferably no more than 90°. When a brightness peak is detected in the peak detection step S4, the worker calibrates the rotation position of the prism 65 while referencing the brightness value 83 displayed on the display 80, such that the brightness value 83 shows the brightness peak. Accordingly, the prism 65 is aligned at the rotation position where the brightness peak is detected (peak position) (positioning step S5).

With the positioning step S5, the prism 65 is positioned such that the measurement optical axis Am is orthogonal to the reflecting surface 91 of the calibration work piece 90. Accordingly, the prism 65 is positioned such that the measurement optical axis Am is parallel to the W axis; in other words, such that the measurement optical axis Am is orthogonal or parallel to the pixel array directions (ix direction and iy direction) of the image capture element 52.

Effect of the Embodiment

The following advantages can be achieved according to the above-described embodiment. According to the present embodiment, in the optical interference measuring device 1, the rotation position of the prism 65 around the standard optical axis As is arranged appropriately. In the optical interference measuring device 1 calibrated according to the present embodiment, the displacement axes pX and pY of the probe 42 in the image 82 can be made parallel to the transverse and vertical directions of the image 82. Therefore, the images 82 of adjacent measurement regions on the work piece can be readily spliced together.

In addition, in the present embodiment, the controller 70 carries out operations as the brightness detector 71, which detects the brightness of the image 82. With the brightness detector 71, the brightness of the image 82 is detected as a numerical value, and therefore the rotation position of the prism 65 around the standard optical axis As can be arranged more accurately. Also, in the present embodiment, the brightness value 83 indicating the brightness of the image 82 is displayed on the display 80. Therefore, the worker can calibrate the rotation position of the prism 65 by referencing the brightness value 83 displayed on the display 80.

Modification

The present invention is not limited to the above-described embodiment, and includes modifications within a scope capable of achieving the advantages of the present invention.

In the embodiment described above, the image 82 is displayed on the display 80, but display of the image 82 may be omitted. In other words, the brightness value 83 may be the only brightness information displayed on the display 80.

In the embodiment described above, the controller 70 carries out operations as the brightness detector 71. However, the present invention is not limited to this, and the image 82 may be the only brightness information displayed on the display 80 without the controller 70 carrying out operations as the brightness detector 71. For example, in the brightness detection step S3, the peak detection step S4, and the positioning step S5, the worker may also detect the brightness of the image 82 by simply looking at the image 82 displayed on the display screen 81, and may judge the brightness peak and carry out alignment of the prism 65 based on the viewed detection information. In other words, as noted above, the "brightness" of the image means the degree of brilliance of the image, and therefore the image 82 displayed on the display screen 81 may be used as the brightness information. Specifically, the worker comprehends the degree of brilliance of the image 82 displayed on the display screen 81, and the worker may judge whether the image 82 becomes brighter or darker each time the prism 65 rotates very slightly. In addition, the prism 65 may be aligned at the rotation position where the image 82 is brightest.

In FIGS. 3B, 4B, and 5B which were referenced in the embodiment described above, in order to provide an illustration where the image 82 is readily understood, the entire image 82 is displayed on the display screen 81. However, it is also possible to display only a partial region of the image 82. In cases where the worker visually detects the brightness of the image 82 displayed on the display screen 81, the worker may also detect the brightness of the partial region of the image 82.

In the embodiment described above, the process of performing the rotation step S2 of rotating the prism 65 very slightly and then performing the brightness detection step S3 is repeated, but the present invention is not limited to this. For example, the brightness of the image 82 may be continuously detected while rotating the prism 65 within a predetermined angle range.

In the rotation step S2 of the embodiment described above, the interference object lens 60 is rotated relative to the image capturer 50. However, the present invention is not limited to this. For example, in the interference object lens 60, the second case 62 which houses the prism 65 may be rotated relative to the first case 61.

The optical interference measuring device 1 according to the embodiment described above includes the display 80. However, at the point in time where the calibration method of the present invention is carried out, the optical interference measuring device 1 need not include the display 80. For example, the brightness of the image 82 captured by the image capture element 52 may be detected using a brightness detector or the like.

In addition, the optical interference measuring device 1 according to the embodiment described above includes the prism 65 as a light splitting and combining element in order to achieve an interferometer, but the present invention is not limited to this. In other words, the light splitting and combining element in the optical interference measuring device 1 can be any element that achieves a splitting optical system that splits light from a light source into measurement light and reference light, and a combining optical system that causes the measurement light reflected off a work piece to interfere with the reference light reflected off a reference plane. In addition, the splitting optical system and the combining optical system may be configured as separate systems.

Furthermore, the calibration method of the optical interference measuring device 1 is described in the embodiment described above, but the present invention is not limited to this. In other words, the calibration method of the present invention can be broadly applied to image measuring devices that include an optical axis converter that bends measurement light reflected off a work piece in a direction lying along a standard optical axis that intersects with a measurement optical axis. For example, the optical axis converter of the present invention is not limited to the light splitting and combining element, and may be configured by a simple mirror or the like.

In addition, in the embodiment described above, the prism 65 (as the optical axis converter) configures both the emission optical system emitting the measurement light toward the work piece and the incident optical system where the measurement light reflected off the work piece is incident. However, the present invention is not limited to this. In other words, the optical axis converter of the present invention should configure at least an incident optical system where the measurement light reflected off the work piece is incident, and the emission optical system emitting the measurement light at the work piece may be configured by an optical system separate from the optical axis converter. Furthermore, the measurement optical axis (direction in which the measurement light reflected off the work piece advances) and the standard optical axis (direction in which the measurement light advances after being bent by the optical axis converter) are not limited to being orthogonal to each other, and may also be configured to at least intersect with each other.

The present invention can be used as a calibration method of an image measuring device for appropriately positioning an optical axis converter that bends measurement light.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A calibration method of an image measuring device, the image measuring device having an optical axis converter bending measurement light reflected off a work piece in a direction lying along a standard optical axis that intersects with a measurement optical axis of the measurement light, and further having an image capture element receiving the measurement light bent by the optical axis converter, the calibration method comprising:
    providing a calibration work piece having a flat reflecting surface as the work piece, and arranging the reflecting surface to be parallel to the standard optical axis and orthogonal or parallel to pixel array directions of the image capture element;
    rotating the optical axis converter centered on the standard optical axis;
    detecting the brightness of an image captured by the image capture element at each of a plurality of rotation positions of the optical axis converter; and
    aligning the optical axis converter at a rotation position where the detected brightness is greatest.

2. The calibration method of the image measuring device according to claim 1, wherein the detecting of the brightness is performed by a brightness detector of the image measurement device.

3. The calibration method of the image measuring device according to claim 1, further comprising displaying brightness information of the detected brightness, for each of the plurality of rotation positions of the optical axis converter, on a display of the image measurement device.

4. The calibration method of the image measuring device according to claim 2, further comprising displaying brightness information of the detected brightness, for each of the plurality of rotation positions of the optical axis converter, on a display of the image measurement device.

* * * * *